United States Patent Office.

JOHN E. BROOKS, OF YARMOUTH, MAINE.

Letters Patent No. 112,776, dated March 21, 1871.

IMPROVEMENT IN GREEN GLAZE FOR FLOWER-POTS.

The Schedule referred to in these Letters Patent and making part of the same.

*To all whom it may concern:*

Be it known that I, JOHN E. BROOKS, of Yarmouth, in the county of Cumberland and State of Maine, have invented a new and useful Improvement in Green Glaze for Flower-Pots; and I do hereby declare that the following is a full, clear, and exact description thereof, which will enable others skilled in the art to make and use the same.

My invention has for its object to furnish an improved green glaze for flower-pots, which shall be so inexpensive as to adapt it for use upon common earthenware, while, at the same time, giving to the ware a beautiful finish; and It consists in the glaze prepared of the ingredients in the proportions and manner hereinafter more fully described.

The ingredients, and the relative proportion of each used, are as follows:

Oxide of lead, twelve pounds; oxide of tin, six ounces; black oxide of copper, six ounces; glass-makers' sand or ground quartz, four pounds; one ounce of saltpeter for a flux, and one and a half pound of stoneware-clay for a vehicle. The tin and lead I prefer to oxidize together.

In preparing the black or protoxide of copper I place sheets of copper in the kiln before burning, which heat causes scales to fall from them. These scales are taken and treated with nitric acid until dissolved. The oxide of copper is then precipitated from the solution by means of spirits of ammonia, and the precipitate, when dry, is subjected to a red heat.

Having thus described my invention,

I claim as new and desire to secure by Letters Patent—

An improved green glaze for flower-pots, prepared of the ingredients in the proportions and manner substantially as herein described and set forth.

JOHN E. BROOKS.

Witnesses:
    WM. C. SWEETSER,
    A. O. SMITH.